United States Patent
Sadkowski et al.

[11] Patent Number: 5,125,937
[45] Date of Patent: Jun. 30, 1992

[54] REVERSIBLE MEMBRANE PLANT

[75] Inventors: Piotr J. Sadkowski, Ash; Michael E. Garrett, Woking, both of England

[73] Assignee: The BOC Group plc, Surrey, England

[21] Appl. No.: 643,410

[22] Filed: Jan. 18, 1991

[30] Foreign Application Priority Data

Jan. 19, 1990 [GB] United Kingdom ............... 9001226

[51] Int. Cl.⁵ ............................................. B01D 53/22
[52] U.S. Cl. ........................................ 55/158; 55/208
[58] Field of Search ..................... 55/16, 68, 158, 208

[56] References Cited

U.S. PATENT DOCUMENTS

| | | | |
|---|---|---|---|
| 2,964,124 | 12/1960 | Peierls et al. | 55/16 |
| 3,252,272 | 5/1966 | Hazen et al. | 55/158 |
| 3,797,200 | 3/1974 | Klass et al. | 55/16 |
| 3,818,679 | 6/1974 | Klass et al. | 55/16 |
| 4,119,417 | 10/1978 | Heki et al. | 55/16 X |
| 4,140,499 | 2/1979 | Ozaki et al. | 55/16 X |
| 4,676,808 | 6/1987 | Coplan | 55/158 |
| 4,681,602 | 7/1987 | Glenn et al. | 55/16 X |
| 4,881,953 | 11/1989 | Prasad et al. | 55/158 X |
| 4,944,776 | 7/1990 | Keyser et al. | 55/16 |
| 4,955,998 | 9/1990 | Ueda et al. | 55/16 |

FOREIGN PATENT DOCUMENTS 2228427  8/1990  United Kingdom .................. 55/16

Primary Examiner—Robert Spitzer
Attorney, Agent, or Firm—Carol A. Nemetz; Robert I. Pearlman

[57] ABSTRACT

A membrane gas separation apparatus, typically for separating air, includes a gas separation cell containing an array of membranes in the form of hollow fibres. The cell has a first gas port and a second gas port. Flow of gas to and from the ports is controlled by a four-port, two-position valve. In one position, the valve admits incoming air to the first port and allows product nitrogen to flow out of the second port. In the other position the roles of the ports are reversed and hence the direction of flow of the gas is reversed. During prolonged operation, there is a tendency for contaminants to affect disproportionately the feed gas inlet of the membrane fibres. By periodically changing the position of the valve, different ends of the membrane fibres are presented to the feed gas, and thus the operating life of the membranes is lengthened.

5 Claims, 1 Drawing Sheet

5,125,937

REVERSIBLE MEMBRANE PLANT

TECHNICAL FIELD

This invention relates to gas separation apparatus. In particular, it relates to apparatus for separating a gas mixture by means of semi-permeable membranes through which the respective components of the mixture diffuse at different speeds.

BACKGROUND OF THE PRIOR ART

The use of semi-permeable membranes to separate gas mixtures has become a well known technique in the production of industrial gases. Known plants for the separation of a gas mixture by such membranes are constructed so as to present a large surface area of membrane to the gas mixture to be separated. For example, such plants may employ a multitude of identical, elongate, hollow fibres which are formed of a suitable semi-permeable membrane and which extend in parallel to one another. The fibres are appropriately mounted typically in a pressure vessel. The gas mixture to be separated is fed into a port at or near one end outside the fibres. It flows longitudinally of the fibres. The insides of the fibres are maintained at a pressure lower than that which obtains on the outside of them. The components of the gas mixture diffuse through the membranes at different speeds. As the gas mixture passes along the outside of the membrane so a faster permeating compound passes more and more to the low pressure side. Accordingly, the gas on the outside of the fibres (the high pressure side) becomes richer in the slower permeating component or components as it flows along the outside of the fibres, and a product gas enriched in the more slowly diffusing component, may be withdrawn at pressure from the end of the pressure vessel opposite that at which the feed gas is introduced. The permeate gas is enriched in the faster diffusing component. The permeate gas is typically withdrawn from the inside of the fibres at the same end of the vessel as that at which the feed gas is introduced. If desired, in an alternative arrangement, the feed gas may be fed to the inside of the hollow fibres and the permeate gas withdrawn from the outside.

It is disclosed in U.S. Pat. No. 4,881,953 that the productivity of the membrane can be reduced by up to 25% by the presence of contaminants in the feed gas mixture. In, for example, the production of nitrogen from air, carry-over of oil vapour from an oil flooded air compressor or the presence of hydrocarbons or acid gases in the ambient air can have a deleterious effect on the membranes. Accordingly, measures such as the use of refrigerated air driers effective to reduce the temperature of the incoming air to below ambient temperature to remove condensible contaminants (e.g. water) and the use of activated carbon filters to treat the feed air downstream of the compressor are commonly taken to minimise the concentration of contaminants in the air entering the membrane vessels. Even if these measures are taken however, some contaminants may still reach the membrane vessel.

Conditions at the feed gas end of the membrane vessel can have a disproportionate effect on the overall performance of the gas separation apparatus. For example, a change in feed air temperature at the feed gas inlet has a large effect on product yield and purity before any change is seen in product temperature at the product gas outlet, i.e. before the membranes reach temperature equilibrium. Contamination by for example oil vapour tends also to be concentrated at the feed gas end of the membrane fibres. The combination of these effects can result in significant degradation of the performance of the apparatus before the majority of the length of the membranes becomes contaminated. It is an aim of the present invention to provide an apparatus which ameliorates the above-described problems.

SUMMARY OF THE INVENTION

According to this invention there is provided a gas separation apparatus including an array of semi-permeable gas separation membranes, which each on one side thereof communicate with opposed first and second gas ports, whereby in use feed gas mixture flowing from one port to the other port along each said one side of the membranes is able to be separated by virtue of different speeds of permeation of the components of the gas mixture through the membranes, whereby the other port receives a product gas of different composition from said feed gas mixture; a feed gas conduit for introducing into the apparatus gas mixture to be separated; a product gas conduit for conveying product gas away from the apparatus, and valve means operable either to place the first port upstream of the second port or vice versa.

The apparatus according to the invention therefore enables the direction of flow between the ports to be reversed at chosen intervals. Such reversal will tend to clean the previously upstream surfaces of the membranes as upon reversal they will be subjected to a flow of clean gas having a relatively low vapour pressure of the gaseous contaminant or contaminants, which will encourage desorption of the contaminants from the membrane. Such desorption can be further encouraged by local heating of the end of membrane cell or module. Typically, electrical heating elements may be used for this purpose. If desired, say 20% of the length of the membranes may be so heated.

If desired, there may be a number of separate arrays of membranes, each typically in its own vessel and in parallel with the others, all the arrays having a common feed gas conduit and a common product gas conduit. Alternatively, or in addition, there may be two or more arrays of membranes, each typically in its own vessel, arranged in series with one another. In such an embodiment, gas from the downstream array may be returned to the upstream array to enhance the overall performance of the apparatus. For example, permeate gas from the downstream array may be used to help purge permeate gas from the vessel containing the upstream array. It is also possible in any embodiment of an apparatus according to the invention to recycle some of the product gas to the feed gas. If such embodiments are employed, then there is an arrangement of conduits and valves which enable the recycling to continue to be performed upon reversal of the feed and product gas ends of the apparatus.

Preferably, said valve means comprises a single four-way valve having four ports, one of which communicates with the feed gas conduit, another of which communicates with the product gas conduit, yet another of which communicates with the said first gas port and the remaining one of which communicates with the said second gas port, and a valve member which is movable between positions such that in one position the feed gas conduit communicates only with the first gas port and the product gas conduit communicates only with the second gas port, and in its other position, the feed gas conduit communicates only only with the second gas port and the product gas conduit communicates only with the first gas port. The valve may be operated manually or automatically.

In an alternative embodiment, two three-way valves may be employed, one such valve when in one position placing the feed gas conduit in communication with the said first gas port and the other such valve when in one position placing the second gas port in communication with the product gas conduit, and the valves reversing these functions in their other position. Such valves may be operated manually or automatically but care needs to be taken to ensure that at no time is the feed gas fed to both ends of the membranes.

The frequency with which the valve means is operated to reverse the feed gas and product ends of the membrane array will depend on the concentration of contaminants in the incoming feed gas. In the example of air separation, the ends may typically be reversed at typically regular intervals each of a duration in the range of 5 to 50 days. More regular reversal may be required in the event that the air is not filtered and refrigerated upstream of its passage through the valve means.

The apparatus according to the invention may be used to separate air or other gas mixtures.

The term 'product gas' is used herein to identify the non-permeate gas produced as a result of the separation irrespective of whether this gas is subsequently used in an industrial process or is merely a waste product with the permeate gas being subsequently used in an industrial process.

BRIEF DESCRIPTION OF THE DRAWINGS

Apparatus according to the invention will now be described by way of example with reference to the accompanying drawings, in which.

DETAILED DESCRIPTION OF THE INVENTION

Figure 1:
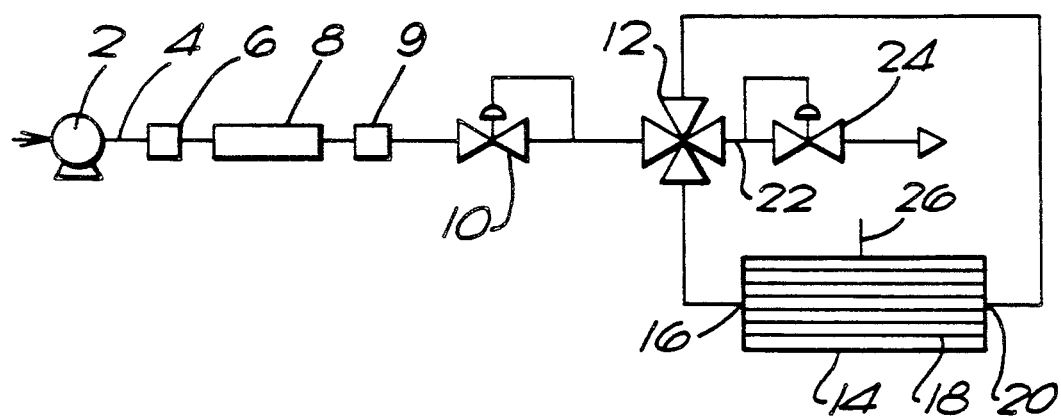
FIG. 1 is a flow diagram illustrating a first embodiment of a membrane separation apparatus according to the invention and FIG. 2 is a flow diagram illustrating a second embodiment of membrane gas separation apparatus according to the invention.

Referring to FIG. 1, an air compressor 2 provides air at a chosen pressure, typically in the range of 2 to 10 bar, to a feed gas conduit 4 having disposed therealong in sequence from upstream to downstream end, a coarse filter 6, to remove water, oil and particles, an air chiller 8, and an activated charcoal filter 9 and a pressure regulator 10. The feed gas conduit 4 terminates in one port of a four-port, two-position valve 12. The remaining three ports of the valve 12 are connected respectively to a first gas port 16 of a membrane gas separation cell (or vessel) 14 containing an array of semi-permeable membranes 18, typically in the form of hollow fibres, able to separate the air to produce a nitrogen product; a second gas port 20 of the cell 14; and a product gas (nitrogen) conduit 22 having a pressure regulator 24 disposed therein. In one of its positions the valve 12 places the first gas port 16 in communication with the feed gas (air) conduit 4 and places the second port 20 in communication with the product gas conduit 22. In its other position the valve 12 reverses the connections such that the feed gas conduit 4 communicates with the port 20, while the port 16 communicates with the product gas conduit 22. The cell 14 also has an outlet 26 in communication with the permeate side (the insides) of the membrane fibres to enable permeate gas to flow continuously out of the cell 14. Equally preferred, although not shown in the drawings, is the opposite arrangement in which the insides of the fibres communicate with the ports 16 and 20, so that the feed gas flows through the fibres, and the permeate gas flows outside the fibres and communicates with the outlet 26.

In operation, with the valve 12 in its first position, air is supplied continuously by the compressor at a chosen pressure to the conduit 4. The air is filtered by passage through the filter 6 and is then chilled to a temperature below ambient. The resulting dried air is presented by the valve 12 to the first port 16 of the cell 14. The air flows into the cell 14. The components of the air other than nitrogen diffuse through the membranes more rapidly than the nitrogen itself, the permeate side of the membranes being maintained at a lower pressure (typically of 1 bar) than the feed gas side thereof. Accordingly, a product gas enriched in nitrogen leaves the cell 14 through the opposite end port 20 and there is a continuous flow of the product gas to the product gas conduit 22. The product gas may then be collected or supplied to an apparatus in which it is made use of. As operation of the apparatus shown in FIG. 1 continues so there tends to be a build up of contaminants on the array of membranes 18 at the end thereof proximate the port 16. Accordingly, after a chosen period of time, say ten days, the valve 12 is switched to its other position so that now air from the feed gas conduit 4 is fed to the port 20 of the cell 14 and flows along the membranes to the port 16 which is now in communication with the product gas conduit 22. Accordingly, the previously contaminated portions of the membranes proximate the port 16 are now flushed with relatively pure product gas with the result that there is a tendency for the impurities to be desorbed and purged from the end of the membrane array 18 proximate the port 16. At the same time, there is a tendency for contaminants in the feed gas stream now to be deposited on the membrane surfaces at the end of the array 18 proximate the port 20. After a chosen period of time the position of the valve 12 may be changed again so that now these impurities can be desorbed and purged from the cell 14.

Referring now to FIG. 2, parts of the apparatus therein identical to corresponding parts of the apparatus shown in FIG. 1 are indicated by the same reference numerals as in FIG. 1 and will not be described again with reference to FIG. 2.

Figure 2:
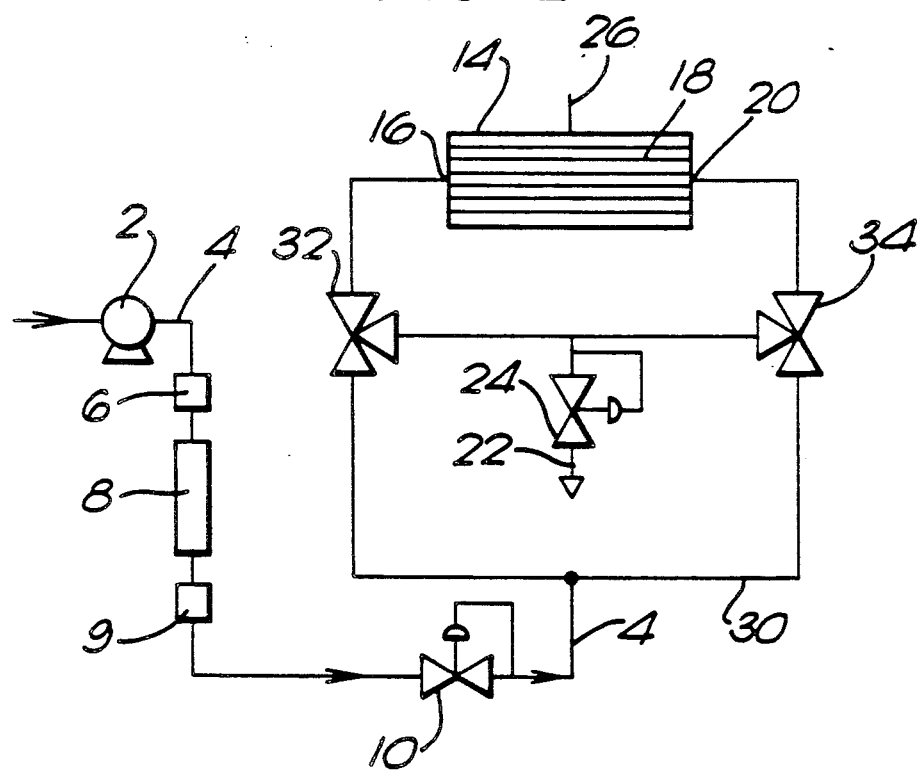

In the apparatus shown in FIG. 2, the feed gas conduit 4 ends in a further conduit 30 which at one end terminates in one port of a three-port, two-position valve 32 and at its other end terminates in one port of another three-way, two-position valve 34. The two other ports of the valve 32 communicate respectively with the port 16 of the membrane cell 14 and the product gas conduit 22. The two other ports of the valve 34 communicate respectively with the port 20 of the membrane cell 14 and the product gas conduit 22. The valves 32 and 34 are preferably interlocked in such a way that neither the feed gas conduit 4 nor the product gas conduit 22 can ever communicate simultaneously with both ports 16 and 20 of the cell 14. Thus, in one position, the valve 32 places the feed gas conduit 4 in communication with the port 16 but prevents communication between that port 16 and the product gas conduit 22, while in the corresponding position the valve 34 permits communication between the port 20 and the product gas conduit 22 but prevents such communication between that port 20 and the feed gas conduit 4; and in its other position the valve 32 permits communication between the port 16 and the product gas conduit 22 but prevents communication between the feed gas conduit 4 and the port 16, while the valve 34 in its corresponding position permits communication between the port 20 and the feed gas conduit 4 but prevents such communication between the port 20 and the product gas conduit 22. In operation with the valves 32 and 34 in the first mentioned of the above positions, chilled air is fed via the valve 32 to the port 16 of the membrane cell 14 and as described with respect to FIG. 1 is separated to produce a nitrogen product gas which leaves the cell 14 through the port 20 and then passes through the valve 34 to the product gas conduit 22. After a prolonged period of operation, say 10 days, there may be a build up of contaminants on the membrane surfaces at the end of the array 18 proximate the port 16. At this stage the positions of the two valves 32 and 34 are reversed so that now the incoming chilled air is fed via the valve 34 to the port 20 and leaves the cell 14 via the port 16 and then flows through the valve 32 to the product gas conduit 22. The port 16 thus becomes the product gas end of the cell 14 and the product gas (nitrogen) tends to desorb and purge contaminants previously deposited on the membrane surfaces at that end of the cell 14. After another, say, 10 days, the position of the valves 32 and 34 may be changed again so that contaminants deposited on the membrane surfaces proximate the port 20 can now be desorbed and purged by virtue of the reversal of the flow of gas through the cell 14.

We claim:

1. A gas separation apparatus including an array of semi-permeable gas separation membranes, which each on one side thereof communicate with opposed first and second gas ports, whereby in use feed gas mixture flowing from one upstream port to the other along each said one side of the membranes is able to be separated by virtue of different speeds of permeation of the components of the gas mixture through the membranes, whereby the other downstream port receives a product gas of different composition from said feed gas mixture; a feed gas conduit for introducing into the apparatus the gas mixture to be separated via the upstream gas port; a product gas conduit for conveying product gas away from the apparatus via the downstream gas port, and valve means operable either to place the first port upstream of the second port or vice versa.

2. Apparatus as claimed in claim 1 including means for heating an end of the array so as in use to encourage the desorption of impurities from said end of the membrane.

3. Apparatus as claimed in claim 1, in which the valve means comprises a single four-way valve having four ports, one of which communicates with the feed gas conduit, another of which communicates with the product gas conduit, yet another of which communicates with the said first gas port and the remaining one of which communicates with the said second gas port, and a valve member which is movable between positions such that in one position feed gas communicates only with the first gas port and the product gas conduit communicates only with the second gas port, and in its other position, the feed gas conduit communicates only with the second gas port and the product gas conduit communicates only with the first gas port.

4. Apparatus as claimed in claim 3, in which the valve member is moved between positions either manually or automatically.

5. Apparatus as claimed in claim 1, in which the valve means comprises two three-way valves, wherein one such valve when in one position places the feed gas conduit in communication with the said first gas port and the other such valve when in one position places the second gas port in communication with the product gas conduit, and wherein the valves each contain a valve member which is movable between positions, and that the functions of the valves are reversed when in their other position, such that one such valve places the feed gas conduit in communication with the second gas port and the other such valve places the product gas conduit in communication with the first such port.

* * * * *